US010313311B2

(12) United States Patent
Bohli et al.

(10) Patent No.: US 10,313,311 B2
(45) Date of Patent: Jun. 4, 2019

(54) METHOD FOR STORING OF DATA WITHIN A CLOUD STORAGE AND A CLOUD STORAGE SYSTEM

(71) Applicant: NEC Europe Ltd., Heidelberg (DE)

(72) Inventors: Jens-Matthias Bohli, Leimen (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 138 days.

(21) Appl. No.: 15/324,755

(22) PCT Filed: Aug. 22, 2014

(86) PCT No.: PCT/EP2014/067927
§ 371 (c)(1),
(2) Date: Jan. 9, 2017

(87) PCT Pub. No.: WO2016/026537
PCT Pub. Date: Feb. 25, 2016

(65) Prior Publication Data
US 2017/0208043 A1 Jul. 20, 2017

(51) Int. Cl.
*H04L 29/06* (2006.01)
*G06F 16/182* (2019.01)
(Continued)

(52) U.S. Cl.
CPC .......... *H04L 63/0428* (2013.01); *G06F 3/067* (2013.01); *G06F 3/0608* (2013.01); *G06F 3/0623* (2013.01); *G06F 3/0641* (2013.01); *G06F 16/1824* (2019.01); *G06F 21/62* (2013.01); *H04L 63/0471* (2013.01); *H04L 67/1097* (2013.01); *G06F 2212/263* (2013.01);
(Continued)

(58) Field of Classification Search
CPC .... G06F 3/0641; G06F 3/067; G06F 16/1824; G06F 2212/263; H04L 63/0471; H04L 63/0428; H04L 67/1097
See application file for complete search history.

(56) References Cited

U.S. PATENT DOCUMENTS

2010/0030791 A1* 2/2010 Iverson ............... G06F 16/1737
713/320
2010/0192211 A1* 7/2010 Bono .................. G06F 21/6209
726/7
(Continued)

FOREIGN PATENT DOCUMENTS

WO    WO 2012158654 A2    11/2012

OTHER PUBLICATIONS

Bellare et al., "DupLESS: Server-Aided Encryption for Deduplicated Storage", pp. 179-194 (Year: 2013).*
(Continued)

*Primary Examiner* — Thaddeus J Plecha
(74) *Attorney, Agent, or Firm* — Leydig, Voit & Mayer, Ltd.

(57) ABSTRACT

A method for storing data at a cloud storage, wherein data of a user is stored at the cloud storage upon a user request, includes encrypting the data of the user; directing the user request to a data manager; and before an uploading of the encrypted data to the cloud storage, performing, by the data manager, a deduplication on the encrypted data, so that uploading of the data is only performed, if the data is not yet stored within the cloud storage.

20 Claims, 1 Drawing Sheet

(51) Int. Cl.
  *G06F 3/06* (2006.01)
  *H04L 29/08* (2006.01)
  *G06F 21/62* (2013.01)
(52) U.S. Cl.
  CPC .. *H04L 2463/061* (2013.01); *H04L 2463/062* (2013.01)

(56) References Cited

U.S. PATENT DOCUMENTS

| | | |
|---|---|---|
| 2010/0332401 A1 | 12/2010 | Prahlad et al. |
| 2012/0159175 A1* | 6/2012 | Yocom-Piatt ....... G06F 11/1453 713/176 |
| 2013/0305037 A1 | 11/2013 | Puttaswamy Naga et al. |
| 2014/0007250 A1* | 1/2014 | Stefanov ................. G06F 21/60 726/26 |
| 2014/0074712 A1* | 3/2014 | Palmer ............... G06Q 20/1235 705/44 |
| 2014/0089008 A1* | 3/2014 | Carner .................. G06Q 50/24 705/3 |
| 2014/0143543 A1* | 5/2014 | Aikas .................. H04L 67/1097 713/168 |
| 2014/0245025 A1* | 8/2014 | Fairless ................. G06F 21/602 713/189 |
| 2014/0351323 A1* | 11/2014 | Sumida .................. G06Q 50/10 709/203 |
| 2015/0227543 A1* | 8/2015 | Venkatesh ........... G06F 9/45533 707/620 |
| 2015/0249647 A1* | 9/2015 | Mityagin .............. G06F 16/178 713/168 |

OTHER PUBLICATIONS

Di Pietro et al., "Boosting Efficiency and Security in Proof of Ownership for Deduplication", 10 pages (Year: 2012).*

Puzio Pasquale et al: "ClouDedup: Secure Deduplication with Encrypted Data for Cloud Storage", 2013 IEEE 5$^{th}$ International Conference on Cloud Computing Technology and Science, IEEE, vol. 1, Dec. 2, 2013 (Dec. 2, 2013), pp. 363-370, XP032573633.

* cited by examiner

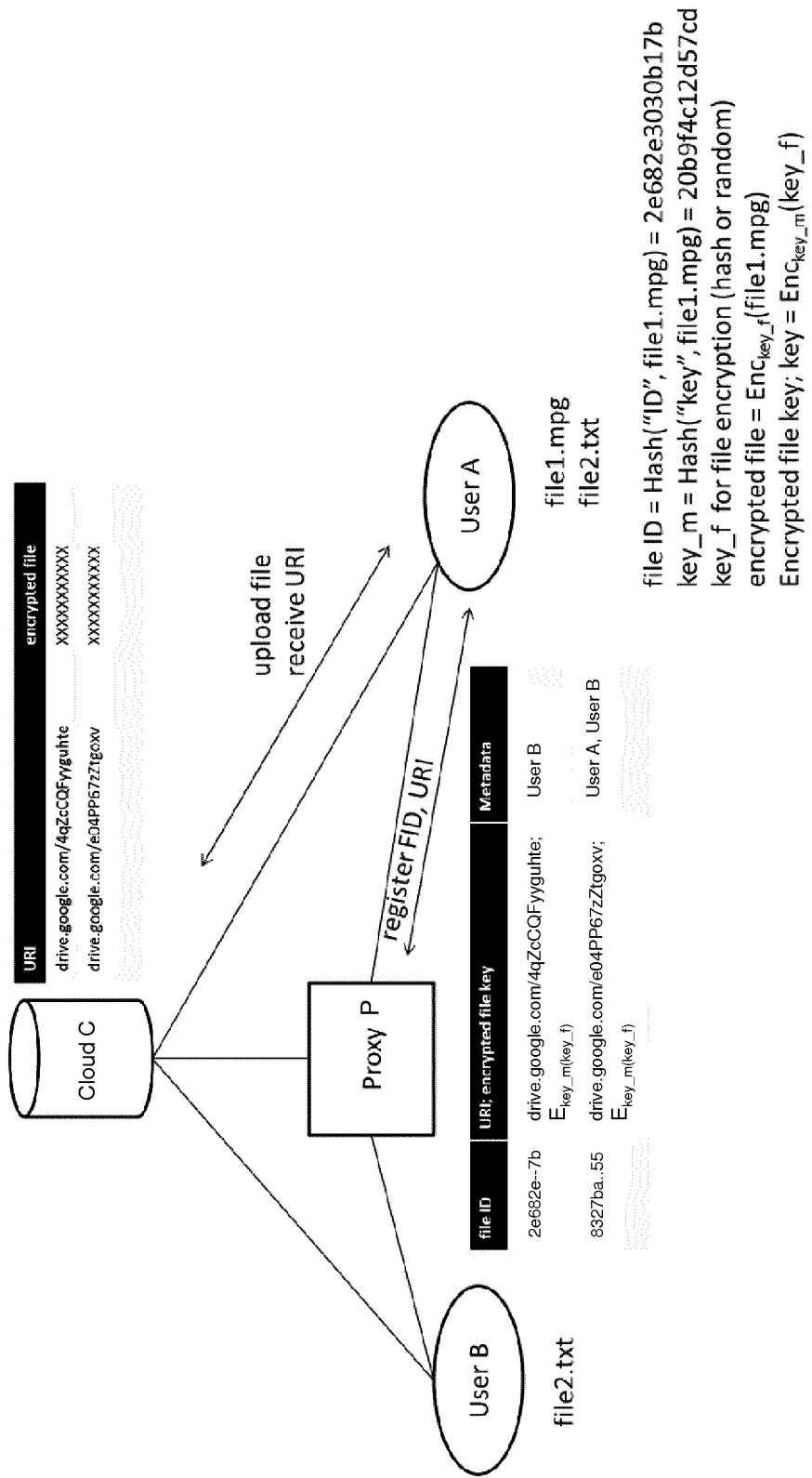

METHOD FOR STORING OF DATA WITHIN A CLOUD STORAGE AND A CLOUD STORAGE SYSTEM

CROSS REFERENCE TO RELATED APPLICATIONS

This application is a U.S. National Stage Application under 35 U.S.C. § 371 of International Application No. PCT/EP2014/067927 filed on Aug. 22, 2014. The International Application was published in German on Feb. 25, 2016 as WO 2016/026537 A1 under PCT Article 21(2).

FIELD

The present invention relates to a method for storing data within a cloud storage, wherein data of a user is stored within the cloud storage upon a request by the user. The present invention further relates to a cloud storage system, comprising a cloud storage, wherein data of a user is stored within the cloud storage upon a request by the user.

BACKGROUND

Cloud storage has recently been receiving increasing attention and is becoming of increasing importance. The cloud offers users a cost-effective, convenient, and highly available storage service. Existing clouds rely on cost effective techniques such as data compression and data deduplication in order to save storage costs. While data deduplication is clearly beneficial as it considerably reduces the cost of storage, cloud users do not really benefit from this technique, since deduplication is typically performed by the cloud itself. In other words, the end-users are being charged the same price, irrespective whether their data has been deduplicated by the cloud. This is quite unfair, since users who are storing popular files that are deduplicated by the cloud should not be charged the same amount for storing non deduplicated content.

Existing work in the area focuses on novel techniques for performing deduplication over encrypted data, see Pasquale Puzio, Refik Molva, Melek Önen and Sergio Loureiro. ClouDedup: "Secure Deduplication with Encrypted Data for Cloud Storage," Proceedings of IEEE CloudCom 2013 and "A Secure Data Deduplication Scheme for Cloud Storage," Jan Stanek, Alessandro Sorniotti, Elli Androulaki, and Lukas Kenc, Proceedings of Financial Cryptography and Data Security, 2014, or focus on the constructing of proof of ownership to attest that a user indeed possesses a file which is deduplicated, see "Boosting Efficiency and Security in Proof of Ownership for Deduplication," Roberto Di Pietro, Alessandro Somiotti, Proceedings of ASIACCS 2012.

SUMMARY

In an embodiment, the present invention provides a method for storing data at a cloud storage, wherein data of a user is stored at the cloud storage upon a user request. The method includes encrypting the data of the user; directing the user request to a data manager; and before an uploading of the encrypted data to the cloud storage, performing, by the data manager, a deduplication on the encrypted data, so that uploading of the data is only performed if the data is not yet stored within the cloud storage.

BRIEF DESCRIPTION OF THE DRAWINGS

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a system model according to an embodiment of the present invention.

DETAILED DESCRIPTION

A method for storing of data within a cloud storage and a cloud storage system for providing an alternative secure cloud storing of data are described herein that additionally allow fair billing of storing data within a cloud storage.

A method is described herein in which data is encrypted, a request is directed to a data manager, and before an uploading of the encrypted data to the cloud storage, the data manager performs a deduplication on the encrypted data, so that uploading of the data is only performed, if the data is not yet stored within the cloud storage.

A cloud storage system is described herein that includes an encryption entity for the data and a data manager, wherein the data manager is constructed to perform a deduplication on prior encrypted data before an uploading of the prior encrypted data to the cloud storage, so that uploading of the data is only performed, if the data is not yet stored within the cloud storage.

As described herein, it is possible to perform deduplication of data to be stored prior to uploading said data to a cloud storage. This can be performed by a preceding data manager performing a deduplication on the data, so that uploading of the data is only performed, if the data is not yet stored within the cloud storage. Thus, only data which is not yet stored within the cloud storage can be uploaded to the cloud storage. This saves storage space within the cloud storage and reduces the amount of data which has to be uploaded to the cloud storage, if a user wishes to store data within the cloud storage. Reduced storage space within the cloud storage will reduce storage costs for the user. Thus, an alternative secure cloud storing of data is provided by the present invention, additionally allowing fair billing of storing data within a cloud storage.

Within a preferred embodiment the data manager can store and/or provide at least one pointer to the data stored within the cloud storage. Thus, a simple and reliable indication of the location of the stored data within the cloud storage is possible. For providing a particular high level of security the at least one pointer can be encrypted.

For providing a reliable and secure performance of the storing method the data manager can maintain a list of data identifiers (IDs) in the cloud and of pointers to the location of the data stored within the cloud storage. Based on such a list a very reliable performance of the storing method is possible.

Within a further preferred embodiment the data manager can maintain a list of users per data stored within the cloud storage. For example, several users can be listed for access to the same data stored within the cloud storage. Thus, costs of the storage of the data within the cloud storage can be divided by the number of users being listed per the same data. As a result, a fair billing of storage costs is possible.

Within a further preferred embodiment the data manager can maintain a list of metadata that allows keeping information for each user that has registered for the data. Thus, managing of the storing method is simple.

For providing a secure cloud storing of data with reliable performance the data manager can adapt its metadata for the data, if the data is already stored within the cloud storage. Particularly in the case of a client requesting for storage of its data, the data manager has simply to adapt its metadata for the data, if the data is already stored within the cloud storage.

Generally, the data can be encrypted with a semantically secure encryption scheme for providing a very high degree of privacy and data security. For providing a very simple and reliable encryption a data encryption key can be encrypted with a key derived from the data content. Such an encryption can be performed by the user in a simple way.

Within a preferred embodiment the user can generate a key f and can encrypt the data with the key f before uploading the data to the cloud storage. Thus, a decryption for a later access to the data is simple for the user. Within such an embodiment only the user has the key, and neither the data manager not the cloud storage.

Within a further concrete embodiment the user can upload an encrypted version of the key f using a key K derived from the data content to the data manager. Thus, the data manager or an according list of the data manager can simply be kept actual.

Further, the user can upload a pointer of the uploaded data to the data manager. Thus, the data manager can provide actual and complete data for access to the stored data by the user.

Within a further preferred embodiment the user can compute a data identifier(ID) based on the knowledge of the content of the data. Such a data ID cloud be acquired by hashing the content of the data with the data name. Thus, a simple and secure method for computing a data ID is provided.

For providing a secure performance of the storing method the data manager can store the data identifier(ID) the encrypted key f and the pointer. This information can be stored within a table for providing simple access to this information.

If a user is no longer interested in the storage of its data the user can notify the data manager of its wish to possibly delete the respective data ID. Then, a revoking of access of a user to data stored within the cloud storage can be performed by changing a Uniform Resource Identifier (URI) of the data. As a result, the user has no longer access to the respective data. Such a changing of the URI of the data can be performed by the cloud storage upon request by the data manager in a simple way.

As an alternative, a revoking of access of a user to data stored within the cloud storage can be performed by changing an access right of the data on the cloud storage by the data manager. Both above mentioned methods for revoking access of a user are effective and simple.

Within a further preferred embodiment the data manager can compute or provide billing information for each user. Thus, a simple and fair billing can be provided on the basis of the number of users registered for the same data within the cloud storage.

For providing a very high degree of data security the data manager can perform a proof of ownership protocol with the user, preferably before registering him. Such proof of ownership protocols ensure that the user indeed possesses the entire data or data file or data block and not only its hash.

Within a further preferred embodiment the privacy can be further increased when the user queries the data manager about a data ID using an oblivious RAM or Private Information Retrieval (PIR).

Within a simple and concrete embodiment the data manager can be a server or proxy server. However, the functionality of the data manager can also be provided within other functional entities and devices depending on an individual situation or surrounding network structure.

The data of the user can be preferably at least one file of data and/or block of data. Usually, data of the user is provided within files and/or blocks.

A novel mechanism is described herein that enables a central server to offer cheap and secure storage by leveraging existing public cloud providers. The invention permits the server to perform deduplication on the data, before the data is actually uploaded to the public cloud, thus allowing the users to share the cost of deduplicated data. The central server only acts as an efficient metadata proxy and stores encrypted pointers to the data stored within the public clouds. Only legitimate users who are eligible to access content can access and decrypt the deduplicated data.

According to preferred aspects of the present invention a deduplication in a server or proxy is managed before uploading data to a cloud storage while ensuring that the data is encrypted with a semantically secure encryption scheme. The deduplication results in minimizing network traffic. The encryption of a data or file encryption key can be performed with a key derived from the massage or data to prevent the proxy or server from accessing the file. A revoking of access of users can simply be performed by randomly changing the file or data URI.

Further important aspects of embodiments of the present invention are as follows:

1) The proxy server or data manager maintains a list of file or data identifiers in the cloud, and a URI pointing to their location on the cloud. The solution ensures that, at all times, the proxy or data manager cannot link the file or data identifiers to the actual file or data content, cannot decrypt the files or data stored at the cloud.
2) In fact, the solution ensures that only those users who possess the file or data can access and decrypt the file or data stored at storage cloud C. If a user wants to upload a file or data which is already stored, then the user registers at proxy or server P in order to acquire access to the file or data. The proxy or data manager also keeps a list of all registered users per file or data in order to bill them later. When a user that is registered to a file or data, wants to access the file or data, it first contacts P, acquires the URI to access the file or data at C, and decrypts the file or data and accesses it.
3) If a user wants to cancel his registration, it informs P, who updates the list of registered users. If the remaining set of registered users is non empty, P changes the URI of the file or data to another random URI. Otherwise, P deletes the file or data from the cloud.
4) Upon billing for storing a file or data, P divides the cost of storage for the file or data among all registered users of the file or data. In this way, each user only pays a fraction of the file or data storage costs, while benefiting from the high availability of cloud storage systems.

Methods and systems described herein provide for considerable advantage over existing schemes in the area. Indeed, the invention enables a new service to offer storage solutions which are as reliable as existing public clouds but at cheaper prices due to the deduplication first on the data. This means that users pay less for the same service offered by public clouds. Moreover, the solution resists against an honest but curious proxy. Indeed, at all times, the proxy never gets to learn any information about the file or data contents that are stored. The proxy also cannot decrypt the files or data stored at the cloud since it does not have the necessary keys.

State of the art encrypts files or data at the cloud using convergent encryption for deduplication purposes. Convergent encryption is a weak encryption since it is a deterministic encryption. In the present solution, the files or data are encrypted using a semantic secure encryption function and a random key K, which offers higher protection against a malicious cloud server.

Finally, the invention deals with revocation of users very efficiently. Existing solutions basically require the proxy to re-encrypt the file or data with a new key and distribute the new keys to the remaining registered users. In the invention, this is handled simply by randomly changing the URI of the file or data at the cloud side. This ensures efficient revocation of read access rights of users to the file or data.

We start by describing the main intuition behind our solution. We assume the following embodiment of a system model shown in FIG. 1. We assume a cloud storage system comprising a data manager in the form of a central proxy P, a number of users U, and a set of cloud servers C forming a cloud storage. We assume that the proxy P is honest but curious. That is, P will correctly follow the protocol but is interested in acquiring information about the stored data.

We note that P is not a storage system by itself. In fact, we assume that P has created a folder onto cloud servers C. Whenever a user wants to store data or a file F in the cloud, the user will first contact P to see if the data or file has been stored before, and if not, then the user will proceed to storing the data or file in the cloud server. In the following and also within the above description the term "file" is used synonymously for the more general term "data". In the same way, the term "server" or "proxy" or "proxy server" is used synonymously for the more general term "data manager". We assume that the proxy server maintains a list of file identifiers in the cloud, and an URI pointing to their location on C. Our solution ensures that, at all times, P cannot link the file identifiers to the actual file content, cannot decrypt the files stored at the cloud. In fact, our solution ensures that only those users who possess the file can access and decrypt the file stored at C. If a user wants to upload a file which is already stored, then the user registers at P in order to acquire access to the file. The proxy also keeps a list of all registered users per file in order to bill them later. When a user that is registered to a file, wants to access the file, it first contacts P, acquires the URI to access the file at C, and decrypts the file and accesses it. If a user wants to cancel his registration, it informs P, who updates the list of registered users. If the remaining set of registered users is non empty, P changes the URI of the file to another random URI. Otherwise, P deletes the file from the cloud. Upon billing for storing a file, P divides the cost of storage for the file among all registered users of the file. In this way, each user only pays a fraction of the file storage costs, while benefiting from the high availability of cloud storage systems.

In what follows, we detail the exact operations that the user and the proxy are involved in throughout this entire process.

Upload a File
1. User computes FID, the file ID, which is an identifier constructed based on the knowledge of the entire file. For instance, FID could be acquired by hashing the contents of the file with the file name. FID=h(F|| file name), where F is the binary contents of the file.
2. User queries the proxy about FID
    a. If FID exists in the proxy's list
        i. The user confirms to the proxy the wish to upload the file.
        ii. The proxy adapts it's metadata for the file, in particular information about the users storing this file, used for billing and deletion of the file in case no user is left. This metadata information basically consists of adding a pointer of the profile of the user to FID and a timestamp.
        iii. Proxy returns the URI and key for the file to the user.
    b. If FID does not exist
        i. the proxy notifies the user.
        ii. the user generates a key_f and encrypts the file. key_f is chosen randomly by the user.
        iii. the user uploads the file to the cloud storage and uploads the URI—chosen with a random file name and can be potentially created by the cloud server—and an encrypted version of key_f using a key K derived from the file contents, e.g., hash of the file, to the proxy.
        iv. the proxy stores FID, the encrypted key_f and URI in a table. The proxy adds information about the user in its metadata for the file, same as above.
        v. The user only stores FID and the key K. This does not have to be stored on local storage, as this information can be stored by the user in its own personal cloud folder.

Download a File
1) The user retrieves FID and key K from its own personal storage.
2) The user queries the proxy for file FID.
3) The proxy checks if the user is registered for the file. If not, the request is denied. If so, the proxy returns URI and key_f encrypted using key K.
4) The user downloads the file at URI from the cloud storage and acquires key_f k_f by decrypting the key using key K, and then decrypts the file using key k_f.

Delete a File
1) The user notifies the proxy of its wish to delete file FID.
2) The proxy adapts it's metadata for file FID and sends the bill to the user according to the routine described in the "Billing users" paragraph.
    a. If no user is left registered for that particular FID, the proxy deletes the file at the storage cloud.
    b. If other users are left, the proxy requests the cloud to change the URI, e.g., randomly changing the identifier of the file in the cloud storage, to effectively revoke access for the user.

Billing Users
The proxy computes billing information for each user based on the files the user has registered. If one file has 4 registered users for example, then each user pays 25% of the costs for storing the file at the cloud.

Alternatively, upon uploading a file, and if the proxy finds out that the file to be uploaded is already stored, i.e., the FID matches to the list, then the proxy performs a proof of ownership protocol with the user before registering him. Proof of ownership protocols ensure that the user indeed possesses the entire file and not only its hash. Proofs of ownership can be conducted for example if the proxy asks the user to hash random block numbers in the file and send the concatenated hash. The proxy then performs the same hashing operation on the stored file and verifies that the result sent by the user matches his computations. If so, the proxy determines that the user has the file and is therefore eligible to be registered for that FID.

In addition, the privacy can be increased if an oblivious RAM or private information retrieval, PIR, is used in "Upload a file," step 2 for querying FID. Furthermore, the proxy could use encrypted metadata to associate the file to users and extract the file usage and billing information using homomorphic properties of the encryption scheme.

Instead of changing the URI of the file to effectively revoke access of users, the proxy can change the access rights of the file on the cloud to prevent access of banned users. This can only work if the originator of the file initially gives the proxy the right to change the rights management of the file stored on the cloud.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing data at a cloud storage, wherein data of a user is stored at the cloud storage upon a user request, the method comprising:
    encrypting the data of the user;
    directing the user request to a data manager;
    before an uploading of the encrypted data to the cloud storage, performing, by the data manager, a deduplication on the encrypted data, so that uploading of the encrypted data is only performed if the encrypted data is not yet stored within the cloud storage, and
    revoking access, of a user that has registered for the data, to the encrypted data stored within the cloud storage by changing a Uniform Resource Identifier (URI) of the encrypted data to another random URI when the registered user cancels their registration.

2. A method according to claim 1, wherein the data manager stores and/or provides at least one pointer to the encrypted data stored within the cloud storage.

3. A method according to claim 1, wherein the data manager maintains a list of data identifiers (IDs) in the cloud storage and of pointers to the location of the encrypted data stored within the cloud storage.

4. A method according to claim 1, wherein the data manager maintains a list of metadata that allows keeping information for each user that has registered for the data.

5. A method according to claim 1, wherein the data manager adapts metadata for the data if the data is already stored within the cloud storage.

6. A method according to claim 1, wherein the data is encrypted with a semantically secure encryption scheme.

7. A method according to claim 1, wherein a data encryption key is encrypted with a key derived from a content of the data.

8. A method according to claim 1, wherein the user generates a key f and encrypts the data before uploading the encrypted data to the cloud storage.

9. A method according to claim 8, wherein the user uploads an encrypted version of the key f using a key k derived from a content of the data to the data manager.

10. A method according to claim 1, wherein the user uploads a pointer of the uploaded encrypted data to the data manager.

11. A method according to claim 1, wherein the user computes a data identifier (ID) based on a knowledge of a content of the data.

12. A method according to claim 11,
    wherein the user generates a key f and encrypts the data using the key f before uploading the encrypted data to the cloud storage,
    wherein an encrypted version of the key f is generated using a key k derived from a content of the data,
    wherein the data manager stores the data identifier (ID), the encrypted version of the key f, and a pointer to the encrypted data.

13. A method according to claim 1, wherein changing the Uniform Resource Identifier (URI) of the encrypted data is performed by the cloud storage upon request by the data manager.

14. A method according to claim 1, wherein the data manager computes or provides billing information for each user.

15. A method according to claim 1, wherein the data manager performs a proof of ownership protocol with the user.

16. A method according to claim 1, wherein the user queries the data manager about a data ID using an oblivious RAM or Private Information Retrieval (PIR).

17. A method according to claim 1, wherein the data manager is a server.

18. A method according to claim 1, wherein the data of the user is at least one file of data and/or block of data.

19. A method according to claim 1, wherein the data manager maintains a list of users per data stored within the cloud storage.

20. A cloud storage system, comprising:
    a cloud storage, data of a user being stored as encrypted data within the cloud storage upon a request by the user;
    an encryption entity for the data; and
    a data manager,
    wherein the data manager is configured to perform a deduplication on the encrypted data before an uploading of the encrypted data to the cloud storage, so that uploading of the encrypted data is only performed if the encrypted data is not yet stored within the cloud storage,
    wherein the data manager is configured to revoke access, of a user that has registered for the data, to the encrypted data stored within the cloud storage by changing a Uniform Resource Identifier (URI) of the encrypted data to another random URI when the registered user cancels their registration.

\* \* \* \* \*